(12) United States Patent
Rogalski, Jr. et al.

(10) Patent No.: US 7,692,820 B2
(45) Date of Patent: Apr. 6, 2010

(54) DEVICE AND METHOD FOR COMPREHENSIVE TEMPERATURE SENSING AND CALIBRATION OF A FULL WIDTH ARRAY IMAGE SENSOR

(75) Inventors: Eugene A. Rogalski, Jr., Webster, NY (US); Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1420 days.

(21) Appl. No.: 11/081,647

(22) Filed: Mar. 17, 2005

(65) Prior Publication Data

US 2006/0209358 A1 Sep. 21, 2006

(51) Int. Cl.
*H04N 1/32* (2006.01)
*G03G 15/20* (2006.01)

(52) U.S. Cl. .................. 358/406; 358/468; 399/33; 399/44

(58) Field of Classification Search ................ 358/475, 358/1.9, 468, 406, 504; 250/332; 399/33, 399/44, 69, 94, 97; 348/180, 188, 243, 244
See application file for complete search history.

(56) References Cited

U.S. PATENT DOCUMENTS

| 4,967,233 | A | 10/1990 | Buchar et al. |
| 5,280,368 | A | 1/1994 | Fullerton |
| 5,907,742 | A * | 5/1999 | Johnson et al. ............... 399/51 |
| 6,038,038 | A * | 3/2000 | Selby et al. .................. 358/446 |
| 6,215,561 | B1 * | 4/2001 | Kakutani ..................... 358/1.9 |
| 6,862,117 | B1 * | 3/2005 | Ford et al. ................... 358/475 |
| 6,958,829 | B2 * | 10/2005 | Mizoguchi et al. .......... 358/3.23 |
| 6,987,892 | B2 * | 1/2006 | Edgar .......................... 382/254 |
| 7,030,378 | B2 * | 4/2006 | Allen et al. .................. 250/332 |

FOREIGN PATENT DOCUMENTS

JP 2002281240 A * 9/2002

* cited by examiner

*Primary Examiner*—James A Thompson
(74) *Attorney, Agent, or Firm*—Oliff & Berridge, PLC

(57) ABSTRACT

A method and or a device for comprehensive temperature calibration of a full width array (FWA) image sensor may minimize loss of productivity and/or image quality. Multiple temperature sensors disposed along a width of the FWA image sensor may provide temperature points used to correct for temperature shifts in output of individual pixel sensors of the FWA image sensor. Under control of a microprocessor, a real-time correction may be calculated for each pixel of the FWA image sensor. The correction may be based upon a real-time temperature profile of the FWA image sensor and temperature dependent factors of at least one calibration equation. The factors may be predetermined, or be determined at factory test, at warm-up or at a specified time.

16 Claims, 2 Drawing Sheets

DEVICE AND METHOD FOR COMPREHENSIVE TEMPERATURE SENSING AND CALIBRATION OF A FULL WIDTH ARRAY IMAGE SENSOR

BACKGROUND

This invention relates to scanners for the acquisition of image information, and more particularly to a device and method, which may calibrate the temperature dependent video output of full width array (FWA) image sensors.

Calibration is required in document scanner applications that use image sensors to achieve a uniform document image. Individual pixel gain and offset errors must be compensated to provide a uniform sensor output. These errors are due to the effects of normal IC processing differences across the sensor, sensor drift, lamp drift and contamination. Calibration is also done to correct for image sensor dark DC level drift with temperature variation, and also to account for lamp and other component aging. During calibration, a black reference point may be collected with the illumination system turned off or by sensing a black calibration target. A white reference point may be collected in a similar manner, e.g., by sensing a white target underneath the platen outside the image area.

Calibration is most often done at start-up during a warm-up period prior to image production. This calibration period normally may take several minutes due to the necessity for components to achieve a relative stable temperature in order to maintain an acceptable level of image quality. Most calibration schemes use a simple calibration strategy having a calibration equation of:

$$y_i = m_i x_i + b_i \quad (1)$$

where for every i pixel there is a gain factor, $m_i$, and an offset factor, $b_i$, applied to the sensor output, $x_i$, to derive the desired sensor output $y_i$. The values of $b_i$ may be set so that $y_i$ is same minimal value for all pixels, with no light signal, and $m_i$ values may be set so that $y_i$ has the same maximum value for all pixels with the maximum possible light signal. The values of $m_i$ and $b_i$ may be stored in a memory and used during real-time correction of sensor video output.

Mechanical devices have been developed to position an optical scanning assembly from a reference position to a calibration position so as to scan calibration target. An exemplary apparatus for physically positioning an FWA image sensor relative to a fixed calibration target for normalizing the sensor response across the array is discussed in U.S. Pat. No. 4,967,233.

U.S. Pat. No. 5,280,368 discloses an apparatus for calibrating a fixed scan head in which an arrangement for providing a calibration target is provided. Unlike the '233 patent in which the scan head moves relative to the calibration target, the '368 apparatus fixes the position of the scan head and adjusts the position of the calibration target relative to the scan head.

U.S. Pat. No. 6,038,038 further discloses a method of compensating for the offset present in image signals produced by an image processing apparatus in an image sensing device or scanner. The method utilizes intermediate reflectance targets to measure the response of each sensor element and then, using the measured responses, fits a characteristic curve to the responses to calculate the response of the sensor element.

Each of the foregoing references is incorporated herein by reference in its entirety.

SUMMARY

Exemplary embodiments of devices and methods for comprehensive temperature calibration of an image sensor may incorporate an industry standard full width array (FWA) image sensor, a plurality of temperature sensing devices disposed along the length of the FWA image sensor, a video driver and preprocessing unit and a temperature calibration unit.

An FWA image sensor may comprise several silicon CMOS sensor chips mounted together end to end with high precision, forming a seamless array of pixels over the length of the array. An FWA image sensor of sufficient length may be used in an image-processing device to scan, at one time, a plurality of pixels the width of a page.

Various exemplary embodiments may simplify the design of image scanners using an FWA image sensor by removing the requirement of mechanical devices to provide relative motion between the sensor and a calibration target. Various exemplary embodiments may calibrate the output of each pixel within the FWA image sensor as well as perform real-time temperature compensation of the output of each pixel by addressing thermal drift, a major contributor to pixel and offset gain errors. Various exemplary embodiments may provide faster access to machine ready time and/or improve image quality during power-on time. As a result, reduced system costs, improved reliability, and/or improved productivity may be achieved.

Exemplary embodiments of devices and methods for comprehensive temperature sensing and calibration of an FWA image sensor may be incorporated within an image scanner and may include an FWA image sensor, a plurality of temperature sensors spatially disposed along the length of the FWA image sensor and a temperature calibration unit electrically connected to the plurality of temperature sensors.

An exemplary method to calibrate an FWA image sensor may include: formulating a general calibration equation taking into account initial pixel-to-pixel offset and gain variations and any temperature dependencies of these variables; determining the temperature profile across the pixels of the sensor; and applying calibration inputs, combined with pixel temperature information, to determine the gain and offset factors of the general calibration equation which is then applied to each pixel output on a real-time basis.

The calibration inputs may be gain and offset factors, which may also be temperature dependent. The factors may be calculated by fitting at least one characteristic curve to captured temperature data. The calibration inputs may be predetermined or be calculated under control of a calibration unit. Calibrating the FWA image sensor may be done at start-up when a relative large gradient in temperature may allow for greater accuracy in determining the factors that will be used during image processing.

It should be understood that the exemplary temperature sensing and comprehensive calibration devices and methods disclosed herein may be used in conjunction with other apparatus having a plurality of sensor inputs, and that the exemplary embodiments described herein are not limiting.

BRIEF DESCRIPTION OF THE DRAWINGS

Various exemplary embodiments are described in detail, with reference to the following figures, wherein.

DETAILED DESCRIPTION OF EMBODIMENTS

The following detailed description of exemplary embodiments is particularly directed to image forming device, such as Xerographic devices, comprising an FWA image sensor and the comprehensive temperature calibration devices and methods herein disclosed. Thus, the following detailed description makes specific reference to image forming devices and their components, such as a scanner illustrated in FIG. 1. However, it should be understood that the principles and techniques described herein may be used in other devices and methods, such as inkjet devices with distributed nozzles, and LED printbars, for example, with pressure sensors with multiple sensing elements on one device.

Calibration of such an image sensor is the process by which individual pixel output errors may be removed to provide a uniform sensor output. These errors may be due to the effects of normal IC processing differences across the sensor, sensor drift, lamp drift and/or contamination. Of all the sources of error that may affect the output of the sensors, temperature variation may be the greatest source of error, especially over short periods of time.

An exemplary method to calibrate an FWA image sensor may include: formulating a general calibration equation taking into account initial pixel-to-pixel offset and gain variations and any temperature dependencies of these variables; determining the temperature profile across the pixels of the sensor; and applying calibration inputs, combined with pixel temperature information, to determine the gain and offset factors of the general calibration equation which is then applied to each pixel output on a real-time basis.

Figure 1:
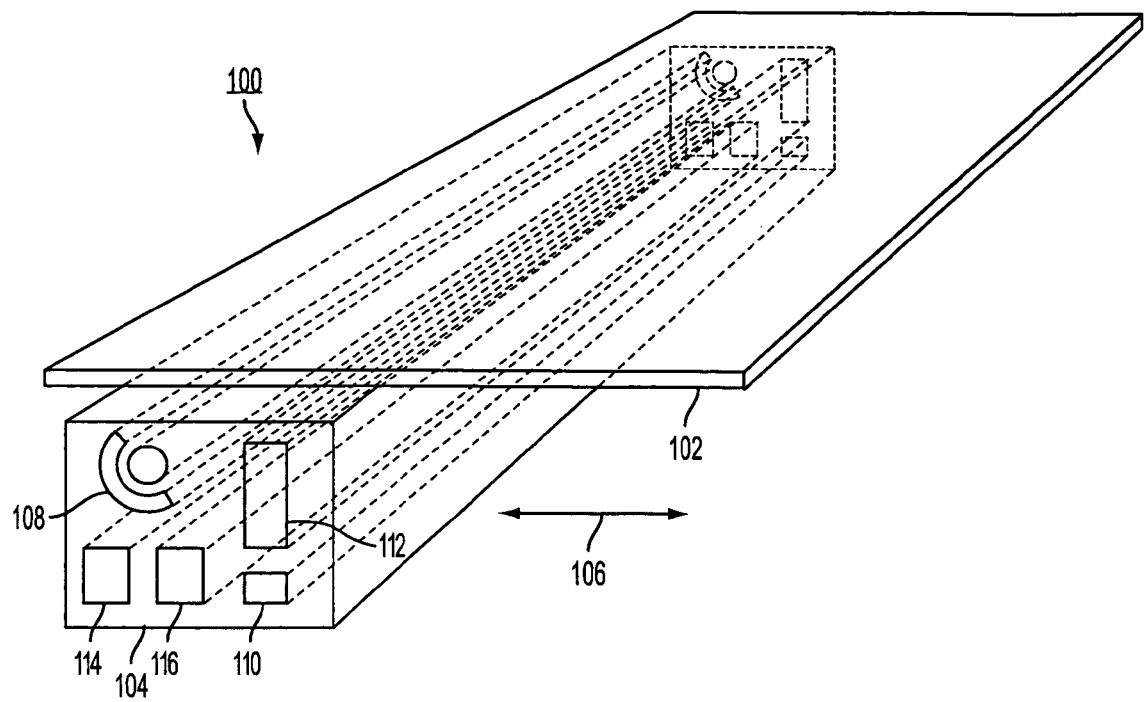
FIG. 1 illustrates an exemplary image scanning device that performs temperature sensing and calibration of an FWA image sensor.

FIG. 1 illustrates an exemplary scanner 100 including a platen 102 on which documents are to be placed, a slideable imaging assembly 104 having a relative motion 106 relative to the platen 102. The assembly 104 may comprise focusing optics 112, an illuminator 108, an image sensor board 110, a video driver and preprocessing unit 114, and a temperature calibration unit 116.

Figure 2:
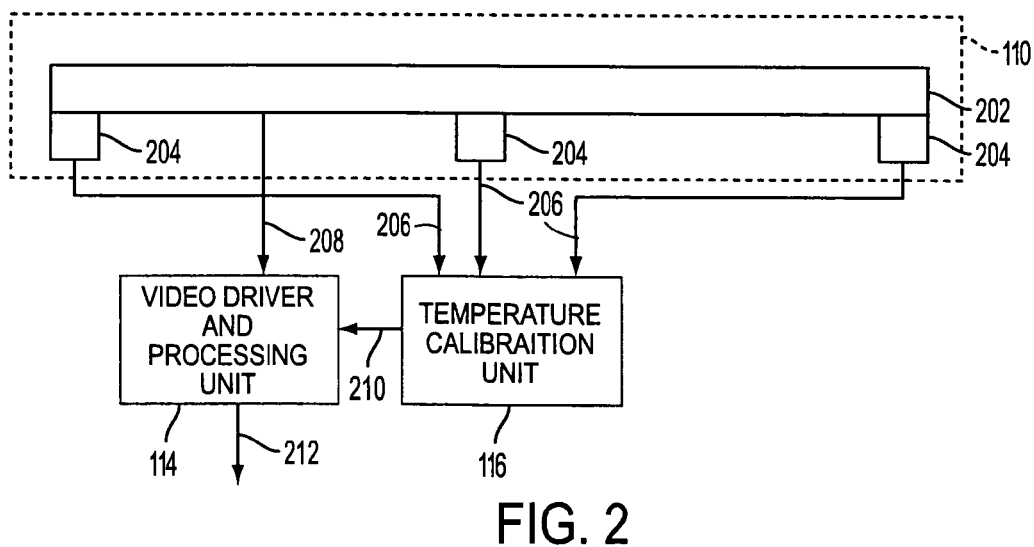
FIG. 2 is an exemplary schematic diagram of a comprehensive temperature calibration device integrated within the image scanner according to FIG. 1.

As shown in the exemplary schematic diagram in FIG. 2, an FWA image sensor 202 may be mounted on the image sensor board 110. The FWA image sensor 202 may provide a plurality of pixels outputs 208 feeding the video driver and preprocessing unit 114. A plurality of temperature sensors 204 may be mounted at selected intervals along the FWA image sensor 202 and may provide spatially distinct temperature readings 206 of the FWA image sensor 202 to the temperature calibration unit 116. The video driver and preprocessing unit 114 may combine the pixel outputs 208 of the FWA image sensor 202 with the outputs 210 of the calibration unit 116 to create a temperature compensated video output 212.

The temperature calibration unit 116 may perform several functions. One function of the temperature calibration unit 116 may be to determine the real-time temperature at each pixel location across the FWA image sensor 202. The temperature gradient across the length of the FWA image sensor 202 may be relatively smooth and gradual. Therefore, as few as three spatially disposed temperature sensors 204 may be adequate to interpolate the pixel temperature across the entire length of the FWA image sensor 202 to within less than 1-2 degrees Celsius of the actual temperature. This degree of accuracy may be sufficient under conditions of normal use and normal temperature sensitivities to gain and offset.

A second function of the temperature calibration unit 116 may be to calculate and store sets of gain and offset factors to be used for the real-time correction of the pixel outputs of the FWA image sensor 202 at the time of image processing. A third function may be to calculate the real-time gain and offset factors of a calibration equation based upon the stored sets of factors and the real-time temperature profile of the pixel sensors.

The real-time gain and offset factors for each pixel may be transmitted to the video driver and preprocessing unit 114, for example, through the video interface 310 and may be used to compensate for the temperature induced errors in the pixel output of the FWA image sensor 202.

Figure 3:
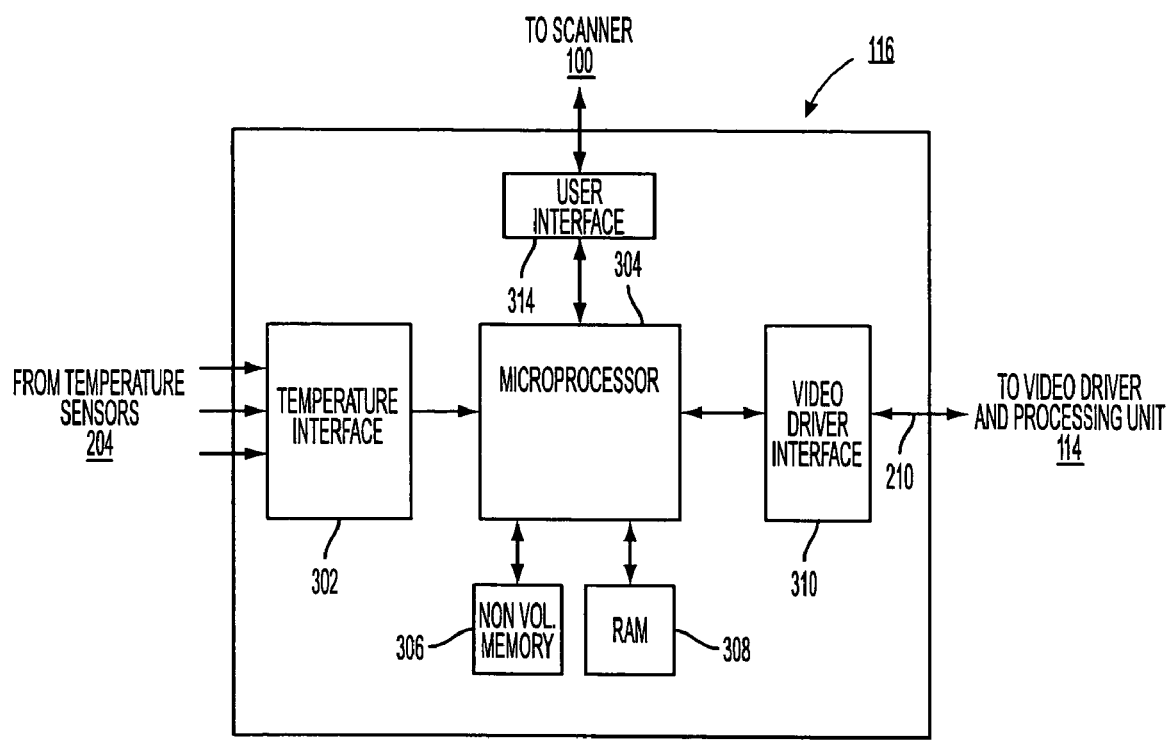
FIG. 3 is an exemplary block diagram of the comprehensive temperature calibration unit of FIGS. 1 and 2.

As shown in FIG. 3, the temperature calibration unit 116 may comprise a temperature sensor interface 302, a microprocessor 304, a non-volatile memory 306, a random access memory (RAM) 308, an interface 310 to the video driver and preprocessing unit 114, and a user interface 314 to the operation and control functions of the scanner 100. The temperature sensor interface 302 may be in electrical communication with the output of each of the temperature sensors 204 and may provide temperature data to the microprocessor 304.

The output of each temperature sensor 204 may be an analog voltage or a digital code, for example, depending on the specific temperature sensor 204 implemented. In an exemplary, non-limiting, embodiment comprising analog temperature sensors 204, the temperature sensor interface 302 may include an analog-to-digital converter, not shown, to convert the analog signal to a digital signal readable by the microprocessor 304. Location of specific components is non-limiting and the components of the calibration unit 116 may be mounted on the image sensor board 110, or in another location within scanner 100, for example.

The microprocessor 304 may be responsive to program instruction code stored in the non-volatile memory 306 and may control the various functions of the temperature calibration unit 116. The program instruction code may include a comprehensive calibration scheme, which, may be used to calibrate all pixels of the FWA image sensor 202 at factory test, at start-up, or at a predetermined, or user selected time.

Calibrating the output of the FWA image sensor 202, whether done at the factory, or done under control of the microprocessor 304 may involve fitting characteristic curves corresponding to both the gain and offset components of a general calibration equation. Using the captured temperature profile of the FWA image sensor 202, a set of gain factors and a set of offset factors may be determined and stored in non-volatile memory 306. During image production, the gain and offset of each pixel output may be calculated using the real-time temperature derived for each pixel and the stored factors.

Unlike calibration equation (1), which does not compensate for temperature changes along the length of FWA image sensor 202, exemplary temperature calibration devices and methods may use a more general calibration equation:

$$y_i = m_i(t_i)x_i + b_i(t_i); \qquad (2)$$

where for every i pixel there is a gain factor, $m_i(t_i)$, and an offset factor, $b_i(t_i)$, applied to the respective pixel output $x_i$, to calculate the compensated pixel output, $y_i$, where $m_i(t_i)$ and $b_i(t_i)$ are functions of temperature $t_i$, where $t_i$ represents the temperature at the i pixel location.

The gain factor, $m_i(t_i)$, may be some other function of temperature, such as linear equation:

$$m_i(t_i) = mO_i + m1_i t_i; \quad (3)$$

where m0i may be the temperature independent factor and $m1_i$ may be the temperature sensitive factor. Similarly, the offset factor, $b_i(t_i)$, used for dark level compensation, may be defined as:

$$b_i(t_i) = bO_i + b1_i t_i + b2_i 2^{(t_i/t_D)}; \quad (4)$$

where, $bO_i$ may be the temperature independent factor, and $b1_i$, $b2_i$ may be temperature dependent factors. Additionally, in the exponent $t_i/t_D$, $t_D$ is the doubling temperature for dark current and $t_i$ may be the difference between $t_i$ and some nominal temperature. The exact form of equations (3) and (4) for gain and offset, respectfully, is non-limiting and may be determined according to the FWA image sensor's sensitivity to temperature, as discussed below.

As previously discussed, the temperature sensors 204 may be able to capture the variations in total temperature rise of the FWA image sensor 202 as the scanner 100 warms-up, or as operating temperature varies over time. Obtaining FWA image sensor temperature points during the warm-up period may provide a sufficient spread of data points from which the calibration unit 116 may determine gain and offset factors that may be used to compensate for errors in pixel output due to subsequent temperature drift. Furthermore, by being able to compensate for wide changes in FWA image sensor temperature, exemplary embodiments of comprehensive temperature sensing and calibration devices and methods may produce quality images soon after startup, thereby reducing the warm-up time required to obtain quality images.

The number of $b_i(t_i)$ offset factors, i.e., $bO_i$-$b2_i$, may depend upon the number of temperature sensitive factors, and therefore dark level sensor outputs may be required to be captured at two, three or more temperature points to provide a sufficient number of data points to fit equation (4) to the captured temperature points. For embodiments implementing equation (4), where the offset factor, $b_i$, has three degrees of freedom, $bO_i$-$b2_i$, at least three dark level captures may be required, at temperatures sufficiently spaced apart, to determine $b_i$ for a reasonable range of operating temperatures.

Because the magnitude of the offset factors, b1 and b2, may be large at reasonable operating temperatures, the temperatures, at which a dark level is captured, should be carefully chosen to separate out the values of b1 and b2. By calibrating the output of the FWA image sensor 202 during machine warm-up when the temperatures gradient will most likely yield the greatest temperature spread, a characteristic curve defining $b_i$ as a function of $t_i$ may be fit with a high degree of accuracy.

Each dark capture may contain several lines that may be averaged and stored in a line buffer in the RAM 308. Temperature sensor outputs may be captured corresponding to each dark capture and an interpolated set of temperature values for each pixel is put in another line buffer. After all averaged video dark captures and corresponding temperature captures are stored in 2n line buffers, for each n temperature, equation (4) may be evaluated to determine the offset factor, $b_i(t_i)$, for each pixel.

In a similar manner, the $m_i$ factors may be determined from the averaged dark and "white" calibration target captures at the temperature points at factory test or warm-up. The microprocessor 304 may store the $m_i(t_i)$ and $b_i(t_i)$ factors in the non-volatile memory 306 or the RAM 308 and are provided to the video driver and preprocessing unit 114 to provide temperature compensation for each pixel output.

Simplifications to the equations may be possible in some cases. The temperature sensitivity of the gain parameter for certain FWA image sensors 202 may be minimal. Under these circumstances, the gain factor may be reduced to $m_i = m0_i$, for each pixel. In some FWA image sensors 202, the dark offset at low temperatures may be negligible, in which case the b0 factor may be eliminated. In other FWA image sensors 202, the dark offset current may be negligible for all operating temperatures and therefore the b2 factor may be eliminated. The b1 factor may be used to obviate the fairly linear, temperature dependent, offset variations for each pixel, image sensor video circuit, and any other external video circuitry.

In most cases, b0 and b1 are not negligible. Thus in normal scanner use, as temperature varies with time, use and environment, periodic calibration may be required to maintain image quality. However, if there are both b1 and b2 effects, it may be possible to pick the calibration temperature such that only the b1 term is significant between two of the temperature points; thereby simplifying the derivation of b2 factors. For example, in an exemplary embodiment having three temperature captures at 22° C., 32° C. and 50° C., where $t_d = 9°$ C., b0 and b1 may be determined from the two relatively low temperature captures, i.e. 22° and 32°, since the $b2_i 2^{(ti/tD)}$ is small compared to $b1_i t_i$ at low temperatures due to the exponential nature of the b2 term with temperature. Once b1 is known, b2 can be determined by using the two highest temperature captures, i.e. 32° C. and 50° C.

In an alternate embodiment, where b0=0 (i.e, a constant or doesn't matter) and $t_d = 9°$ C., if dark captures are taken at $t_i = 0°$ C. (i.e. the starting temperature at power-up), $t_i = 4°$ C., and $t_i = 36°$ C., then the values of b0, $b1_i t_i$, b2 and $b2_i 2^{(ti/tD)}$ at those temperatures may be calculated as shown in Table 1.

TABLE 1

| Calculated Coefficients at 3 Temperature Captures | | | |
|---|---|---|---|
| | $t_i = 0°$ C. | $t_i = 4°$ C. | $t_i = 36°$ C. |
| b0 | 0 | 0 | 0 |
| $b1_i t_i$ | 0 | 8 | 72 |
| $b2i2^{(ti/tD)}$ | 2 | 2.8 | 45.2 |

As shown in Table 1, the change in the b2 term is small compared to the change in the b1 term between $t_i = 0$ and $t_i = 4$. Therefore, the b1 term may be extracted from the first two captures. The value of b1 may then be used with the $t_i = 36°$ C. capture value of b to determine the b2 component.

Once the $m_i(t_i)$ and $b_i(t_i)$ factors are determined and stored, the FWA image sensor output 208 may be constantly updated pixel by pixel, line by line and page by page, as quickly as temperature readings are taken and interpolated into the current temperature memory line to determine the temperature of each pixel.

Periodic recalibration of the pixel outputs 208 of the FWA image sensor 202 may be required due to the fact that over a long period of time, there may be some aging that may have an effect on the value of the offset factors. Furthermore, over a shorter period of time, contamination in the optical path may affect the gain factors.

In practical applications, one may prefer to generate the gain and offset factors at specific times, i.e., warm-up of the scanner 100, during a calibration cycle per use period, or a predetermined time.

Alternatively, a combination of factory calibration and machine directed calibration may be used, providing the option to recalibrate under microprocessor control. In such embodiments, the factory calibrated FWA image sensor 202 may permit continuous production imaging during warm-up, with good image quality and no negative productivity impact. If the gain and offset factors need to be updated to account for changes in operating conditions that may bring the temperature of the FWA image sensor outside the curve plotted by equation (3) or (4), recalibration may be done at any time under control of the microprocessor 304. Furthermore, the microprocessor 304 may use the time between scanning to verify that the current calibration scheme is still meeting a certain level of image quality, for example, by scanning calibration targets in the machine.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art and are also intended to be encompassed by the following claims.

What is claimed is:

1. An image processing device comprising:
    a full width array image sensor including a plurality of pixel sensors, each pixel sensor providing an output, the full width array image sensor scanning an image on a recording medium;
    a plurality of temperature sensors disposed along a length of the image sensor, each of the temperature sensors providing an output; and
    a temperature calibration unit in communication with the temperature sensors, the temperature calibration unit configured to generate a calibration output comprising temperature compensated factors based on the outputs of the temperature sensors;
    wherein the temperature calibration unit:
        formulates a calibration equation that calibrates pixel sensor-to-pixel sensor offset and gain variations for the image sensor;
        obtains the real-time temperature output of each of the plurality of temperature sensors;
        determines the temperature of each of the pixel sensors of the image sensor based upon the real-time temperature output of the plurality of temperature sensors;
        determines calibration factors comprising a temperature dependent gain factor, $m_i(t_i)$, and a temperature dependent offset factor, $b_i(t_i)$; and
    generates the calibration output based upon the calibration factors and the calibration equation for each pixel sensor based upon a series of temperature points for each pixel sensor of the image sensor.

2. The image processing device of claim 1, wherein the temperature calibration unit further comprises:
    a microprocessor;
    memory accessible to the microprocessor; and
    program instruction code stored in the memory, the program instruction code configured to determine the temperature compensated factors based on the outputs of the temperature sensors.

3. The image processing device of claim 1, further comprising a video driver and preprocessing unit, the video driver and preprocessing unit electrically connected to each pixel sensor and the temperature calibration unit, the video driver and preprocessing unit configured to adjust the output of each pixel sensor based upon the output of the temperature calibration unit, whereby the output of each pixel sensor is compensated for changes in temperature along the length of the image sensor.

4. The image processing device of claim 1, wherein the temperature calibration unit determines the calibration factors at start-up of the image processing device.

5. The image processing device of claim 1, wherein the temperature calibration unit determines the calibration factors at pre-determined periods.

6. The image processing device of claim 1, wherein the image processing device is a Xerographic device.

7. The image processing device of claim 1, further comprising a user interface.

8. A temperature sensing and calibration device comprising:
    a plurality of temperature sensors spatially disposed along a full width array image sensor that comprises a plurality of pixel sensors that scan an image on a recording medium, each pixel sensor of the full width array image sensor having a temperature and providing a video output to be calibrated, each of the plurality of temperature sensors providing an output indicative of the temperature of each pixel sensor of the image sensor;
    a microprocessor;
    memory accessible to the microprocessor; and
    program instruction code stored in the memory, the program memory configured to formulate a calibration equation taking into account pixel sensor-to-pixel sensor offset and gain variations for the image sensor; to determine a real-time temperature profile across the pixel sensors; and to calculate calibration outputs based upon calibration factors and the real-time temperature of the pixel sensors,
    wherein calculating the calibration outputs further comprises evaluating, in real-time, a temperature dependent gain factor, $m_i(t_i)$, and a temperature dependent offset factor, $b_i(t_i)$, wherein for every i pixel sensor there is a pixel sensor temperature t, and the calibration outputs is based on the evaluation.

9. A method of calibrating the output of a full width array image sensor including a plurality of pixel sensors that scan an image on a recording medium, the method comprising:
    formulating a calibration equation taking into account pixel sensor-to-pixel sensor offset and gain variations for the image sensor;
    positioning a plurality of temperature sensors at a plurality of spatially distinct locations along the full width array image sensor, each of the temperature sensors providing an output;
    obtaining the output of the plurality of temperature sensors at the plurality of spatially distinct locations;
    determining a real-time temperature profile across the plurality of pixel sensors based upon the output of the plurality of temperature sensors; and
    calculating calibration outputs based upon calibration factors and the real-time temperature of the plurality of pixel sensors,
    wherein calculating the calibration outputs further comprises evaluating, in real-time, a temperature dependent gain factor, $m_i(t_i)$, and a temperature dependent offset factor, $b_i(t_i)$, wherein for every i pixel sensor there is a pixel sensor temperature t, and calculating the calibration outputs based on the evaluation.

10. The method of claim 9, further comprising determining real-time temperature of each pixel based upon the output of the plurality of temperature sensors.

11. The method of claim 9, further comprising calculating $b_i(t_i)$, for each pixel sensor of the plurality of pixel sensors by evaluating the equation:

$$b_i(t_i) = bO_i + b1_i t_i + b2_i 2^{(t_i/t_D)};$$

where $bO_i$ is a temperature independent factor, $b1_i$ and $b2_i$ are temperature dependent factors and $t_D$ is a doubling temperature for dark current.

12. The method of claim 9, further comprising calculating $m_i(t_i)$ for each pixel sensor of the plurality of pixel sensors by evaluating the equation:

$$m_i(t_i) = m0_i + m1_i t_i;$$

where $m0_i$ is a temperature independent factor and $m1_i$ is a temperature sensitive factor.

13. The method of claim 9, further comprising determining at least one factor of at least one of $m_i(t_i)$ and $b_i(t_i)$ during warm-up of the full width array image sensor.

14. The method of claim 9, further comprising determining at least one factor of at least one of $m_i(t_i)$ and $b_i(t_i)$ at a predetermined time.

15. The method of claim 9, further comprising determining at least one factor of at least one of $m_i(t_i)$ and $b_i(t_i)$ using a number of temperature points at least equal to a number of degrees of freedom of a respective offset factor, $b_i$.

16. The method of claim 9, further comprising calculating a temperature compensated pixel sensor output, $y_i$, by evaluating the equation:

$$y_i = m_i(t_i) x_i + b_i(t_i);$$

based upon pixel sensor output $x_i$.

* * * * *